US011435807B2

(12) United States Patent
Golan et al.

(10) Patent No.: US 11,435,807 B2
(45) Date of Patent: *Sep. 6, 2022

(54) POWER MANAGEMENT USING AUTOMATION ENGINE

(71) Applicant: Red Hat Israel, Ltd., Raanana (IL)

(72) Inventors: Roy Golan, Raanana (IL); Eli Mesika, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 27 days.

This patent is subject to a terminal disclaimer.

(21) Appl. No.: 16/880,614

(22) Filed: May 21, 2020

(65) Prior Publication Data

US 2020/0285296 A1    Sep. 10, 2020

Related U.S. Application Data

(63) Continuation of application No. 15/868,257, filed on Jan. 11, 2018, now Pat. No. 10,671,143.

(51) Int. Cl.
*G06F 1/3234* (2019.01)
*G06F 1/3206* (2019.01)

(52) U.S. Cl.
CPC .......... *G06F 1/3234* (2013.01); *G06F 1/3206* (2013.01)

(58) Field of Classification Search
CPC .............................. G06F 1/3234; G06F 1/3206
See application file for complete search history.

(56) References Cited

U.S. PATENT DOCUMENTS

| 7,653,682 | B2 * | 1/2010 | Erasani ............... H04L 67/1097 709/201 |
| 7,676,687 | B2 * | 3/2010 | Gunda ................. G06F 11/004 714/4.4 |
| 8,209,554 | B2 | 6/2012 | Parker, Jr. et al. |
| 8,495,323 | B1 * | 7/2013 | Tatavarty ............... G06F 3/067 711/164 |
| 9,043,636 | B2 | 5/2015 | Cai |
| 9,503,455 | B2 | 11/2016 | Candelaria et al. |

(Continued)

FOREIGN PATENT DOCUMENTS

CN        105245371 A       1/2016

OTHER PUBLICATIONS

Author Unknown, "6.5.5 Configuring Host Power Management Settings," Administration Guide, access.redhat.com/documentation/en-US/Red_Hat_Enterprise_Virtualization/3.4/html/Administration_Guide/Assigning_system_administrator_role_to_a_storage_domain.html, accessed Oct. 9, 2017, Red Hat, Inc., 4 pages.

(Continued)

*Primary Examiner* — Aurel Prifti
(74) *Attorney, Agent, or Firm* — Dority & Manning, P.A.

(57) ABSTRACT

Proxy-less power management using an automation engine is disclosed. An entity manager executing on a computing device determines that a first entity requires a power management function to be performed against the first entity. The entity manager generates power management execution information that identifies a power device address of a power management device that controls the first entity. An automation engine is initiated on the computing device with the power management execution information to cause the power management function to be performed against the first entity via the power management device based on the power management execution information.

16 Claims, 6 Drawing Sheets

(56) References Cited

U.S. PATENT DOCUMENTS

| | | | |
|---|---|---|---|
| 9,679,122 | B1 | 6/2017 | DeHaan et al. |
| 9,720,757 | B2 | 8/2017 | Akirav et al. |
| 10,282,226 | B2* | 5/2019 | Warkentin ......... G06F 11/3423 |
| 10,884,775 | B2* | 1/2021 | Nagy .................... G06F 9/5077 |
| 2010/0174811 | A1 | 7/2010 | Musiri et al. |
| 2010/0306566 | A1* | 12/2010 | Dehaan ................ G06F 1/3234 |
| | | | 713/330 |
| 2011/0022812 | A1* | 1/2011 | van der Linden .. H04L 67/1097 |
| | | | 711/163 |
| 2011/0059749 | A1* | 3/2011 | Hefner ................. H04W 4/029 |
| | | | 455/456.1 |
| 2011/0083023 | A1 | 4/2011 | Dickens et al. |
| 2011/0289344 | A1* | 11/2011 | Bae ....................... G06F 11/202 |
| | | | 714/4.2 |
| 2012/0120858 | A1* | 5/2012 | Das ................... H04W 52/0229 |
| | | | 370/311 |
| 2013/0007481 | A1 | 1/2013 | Chakra et al. |
| 2013/0275793 | A1* | 10/2013 | Yagi ..................... G06F 1/3209 |
| | | | 713/323 |
| 2014/0040647 | A1 | 2/2014 | Bridges et al. |
| 2014/0052691 | A1* | 2/2014 | Sasson .................. G06F 16/27 |
| | | | 707/625 |
| 2014/0156684 | A1 | 6/2014 | Zaslavsky et al. |
| 2014/0337282 | A1* | 11/2014 | Mesika .................. G06F 16/21 |
| | | | 707/609 |
| 2015/0020195 | A1* | 1/2015 | Alizadeh-Shabdiz ...................... |
| | | | H04L 63/1408 |
| | | | 726/22 |
| 2015/0381411 | A1 | 12/2015 | Keagy et al. |
| 2016/0077576 | A1* | 3/2016 | Karhu .................. G06F 1/3246 |
| | | | 713/323 |
| 2016/0291671 | A1 | 10/2016 | Rider et al. |
| 2017/0034023 | A1 | 2/2017 | Nickolov et al. |
| 2017/0041303 | A1 | 2/2017 | Trimmer et al. |
| 2017/0269957 | A1 | 9/2017 | Kamata et al. |
| 2018/0107390 | A1* | 4/2018 | Bae ....................... G06F 9/5027 |
| 2018/0115464 | A1 | 4/2018 | Fighel |
| 2018/0120917 | A1 | 5/2018 | Srinivasan et al. |
| 2018/0121822 | A1 | 5/2018 | Aghasaryan et al. |
| 2018/0373304 | A1 | 12/2018 | Davis et al. |
| 2019/0025903 | A1* | 1/2019 | Mehta ................. G06F 9/45558 |
| 2019/0130008 | A1 | 5/2019 | Nakagoe |
| 2019/0190778 | A1 | 6/2019 | Easterling et al. |
| 2019/0204903 | A1* | 7/2019 | Buck, Jr. ................. G06F 1/163 |
| 2019/0212804 | A1 | 7/2019 | Golan et al. |

OTHER PUBLICATIONS

Author Unknown, "Power Management and Fencing," Technical Reference Guide, Chapter 5, access.redhat.com/documentation/en-US/Red_Hat_Enterpnse_Virtualization/3.0/html/Technical_Reference_Guide/chap-Technical_Reference_Guide-Power_Management_and_Fencing.html, accessed Jan. 11, 2018, Red Hat, Inc., 4 pages.

Perina, Martin, "Host fencing in oVirt: Fixing the unknown and allowing VMs to be highly available," slideshare.net/MartinPeina/host-fencing-in-ovirt-fixing-the-unknown-and-allowing-vms-to-be-highly-available, 2016, Red Hat Inc., 21 pages.

Proffitt, Brian, "Manage oVirt with Ansible Playbooks," Blog, ovirt.org/blog/2016/09/manage-ovirt-with-ansible-playbooks/, Sep. 26, 2016, oVirt, 2 pages.

Weissig, Justin, "Episode #43—19 Minutes With Ansible (Part 1/4)," sysadmincasts.com/episodes/43-19-minutes-with-ansible-part-1-4, Jan. 13, 2015, Sysadmin Casts, 13 pages.

Non-Final Office Action for U.S. Appl. No. 15/868,257, dated Oct. 7, 2019, 17 pages.

Notice of Allowance for U.S. Appl. No. 15/868,257, dated Jan. 29, 2020, 8 pages.

* cited by examiner

POWER MANAGEMENT USING AUTOMATION ENGINE

RELATED APPLICATION

This application is a continuation of co-pending U.S. patent application Ser. No. 15/868,257, filed on Jan. 11, 2018, entitled "POWER MANAGEMENT USING AUTOMATION ENGINE," which is hereby incorporated herein by reference in its entirety.

TECHNICAL FIELD

The examples relate generally to power management and, in particular, to proxy-less power management using an automation engine.

BACKGROUND

A power management device is a device that is coupled to an entity, such as a computing device, and can perform basic operations on the entity, such as stopping the entity, starting the entity, and restarting the entity. These functions can be important, for example, to remove a malfunctioning entity from a cluster of entities, to attempt to reboot a malfunctioning entity to bring the entity to a functioning state, or to turn off entities when not needed to reduce power consumption.

SUMMARY

The examples disclosed herein implement a proxy-less power management function that does not require a proxy host, and that allows highly flexible power management functionality via an automation engine.

In one example a method is provided. The method includes determining, by an entity manager executing on a computing device, that a first entity requires a first power management function to be performed against the first entity. The method further includes generating first power management execution information that identifies a power device address of a first power management device that controls the first entity. The method further includes initiating, on the computing device, an automation engine with the first power management execution information to cause the first power management function to be performed against the first entity via the first power management device based on the first power management execution information.

In another example a computing device is disclosed. The computing device includes a memory and a processor device coupled to the memory. The processor device is to determine, by an entity manager executing on the computing device, that a first entity requires a first power management function to be performed against the first entity. The processor device is further to generate first power management execution information that identifies a power device address of a first power management device that controls the first entity. The processor device is further to initiate, on the computing device, an automation engine with the first power management execution information to cause the first power management function to be performed against the first entity via the first power management device based on the first power management execution information.

In another example a computer program product is disclosed. The computer program product is stored on a non-transitory computer-readable storage medium and includes instructions to cause a processor device to determine, by an entity manager executing on a computing device, that a first entity requires a first power management function to be performed against the first entity. The instructions further cause the processor device to generate first power management execution information that identifies a power device address of a first power management device that controls the first entity. The instructions further cause the processor device to initiate, on the computing device, an automation engine with the first power management execution information to cause the first power management function to be performed against the first entity via the first power management device based on the first power management execution information.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
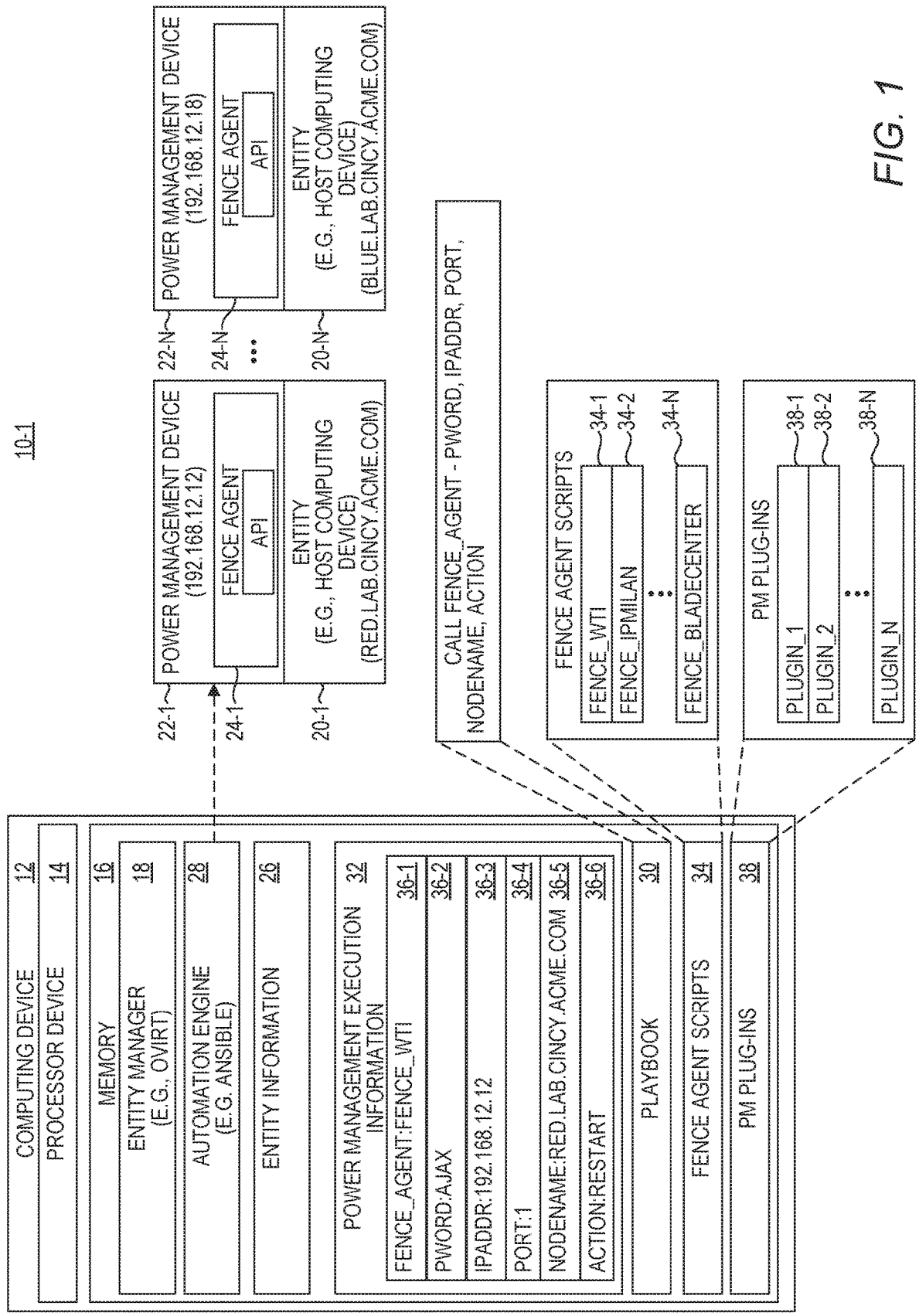
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first entity" and "second entity," and does not imply a priority, a type, an importance, or other attribute, unless otherwise stated herein. As used herein and in the claims, the articles "a" and "an" in reference to an element refers to "one or more" of the element unless otherwise explicitly specified.

Entity managers manage a plurality of entities in a system. An example of an entity manager is a virtualization manager, such as oVirt, available at (www.ovirt.org), which manages a plurality of host computing devices and virtual machines that are executed on the host computing devices. The entity manager may be responsible for maintaining information about a plurality of different types of entities, such as host computing device entities and virtual machine entities, for example. The entity manager may also be responsible, for example, for executing and terminating, or causing the initiation of and termination of, entities. For example, the entity manager may be responsible for initiating, or causing the initiation of, virtual machines on particular host computing devices.

In many production environments host computing devices are coupled to, and controllable by, a corresponding power management device that can implement power management functions on the host computing device, such as a start power management function to start the host computing device, a stop power management function to stop the host computing device, and a restart power management function to restart the host computing device.

These functions can be important, for example, to remove a malfunctioning host computing device from a cluster of host computing devices, to attempt to reboot a malfunctioning host computing device to bring the host computing device to a functioning state, or to turn off host computing devices when not needed to reduce power consumption. A power management device allows these power management functions to be automated and eliminates the need for a human to physically manipulate the host computing device. This may be particularly important where host computing devices are geographically separated from one another, and/or where there are hundreds or thousands of host computing devices in the system.

Conventional entity managers often utilize a proxy-based power management mechanism. In particular, when a target host computing device needs a power management function to be performed against it, the entity manager identifies another operable (proxy) host computing device, and sends the proxy host computing device power management commands that the proxy host computing device is to implement against the target host computing device. In order for a host computing device to be a proxy host computing device, the proxy host computing device must have a proxy power management executable function installed on the proxy host computing device.

The proxy-based power management function has several drawbacks. One drawback is that it requires two computing devices, the proxy host computing device and the target host computing device, to implement power management functions. In a one-system installation this is problematic. Another drawback is that the proxy power management executable function may not be modifiable to a user of the system. If the user desires a different power management executable function, the user must contact the manufacturer of the proxy power management executable function to request that the desired functionality be implemented. Even if the manufacturer agrees to do so, there may be a long delay before the functionality is developed, tested, and released to end-user customers.

The examples disclosed herein eliminate the need for a proxy host computing device to implement power management functions. The examples also implement a mechanism for implementing power management functions that is easily modifiable, and thus that allows end-users to implement new power management functionality without a need to wait for a third-party, such as a manufacturer of the entity management system, to implement the new power management functionality.

FIG. 1 is a block diagram of an environment 10-1 in which examples may be practiced according to one example. The environment 10-1 includes a computing device 12. The computing device 12 includes a processor device 14 and a memory 16. An entity manager 18 executes on the computing device 12. The entity manager 18 can be any function that is responsible for maintaining a status of a plurality of entities. In this example, one set of entities managed by the entity manager 18 are a plurality of host computing devices 20-1-20-N (generally, host computing devices 20). While for purposes of illustration only two host computing devices 20 are illustrated, the environment 10-1 may include hundreds, thousands, or any number of host computing devices 20. In one example, the entity manager 18 is a virtualization manager, such as oVirt. The entity manager 18 may be responsible for managing sets of different types of entities. For example, in addition to managing the host computing devices 20, the entity manager 18 may be responsible for managing virtual machines that are initiated on the host computing devices 20.

Some, or all, of the host computing devices 20 are coupled to corresponding power management devices 22-1-22-N (generally, power management devices 22). Each power management device 22 is configured to, upon request, implement power management functions on the corresponding host computing device 20, such as a start power management function, a stop power management function, and a restart power management function. Each power management device 22 includes a fence agent 24-1-24-N (generally, fence agents 24) that is callable, or invocable, by an external process to direct the power management device 22 to perform the power management function on the corresponding host computing device 20. Each fence agent 24 is associated with a particular type of power management device 22, and differs based on the particular type of power management device 22. The power management devices 22 may be separate machines that are coupled to a corresponding host computing device 20, or may be integrated into a same housing as the corresponding host computing device 20, but be separately addressable from the host computing device 20.

The entity manager 18 maintains entity information 26 that stores information about the host computing devices 20. For example, for each respective host computing device 20, the entity information 26 may identify the name of the respective host computing device 20, the internet protocol (IP) address of the respective host computing device 20, authentication credentials for the respective host computing device 20, a power management device identifier that identifies the corresponding power management device 22 that controls the respective host computing device 20, the credentials of the power management device 22, and the IP address of the power management device 22. The entity information 26 may also include status information for each host computing device 20, such as "OK" or "unresponsive."

The entity manager 18 may determine at some point in time that a host computing device 20, such as the host computing device 20-1, which was responding, has become unresponsive. This may be determined, for example, by a failure of the host computing device 20-1 to respond to a periodic polling request from the entity manager 18.

The computing device 12 also includes an automation engine 28. Upon request, the automation engine 28 accesses a command file, such as a playbook 30, and executes the command file based on the contents of the command file and the values assigned to various variables. The automation engine 28 may comprise any suitable automation engine that implements functionality based in part on an input command file. In one example the automation engine comprises the Ansible automation engine (available at www.ansible.com).

Note that the Ansible automation engine does not require agents executing on the host computing devices 20 that are processed by the Ansible automation engine.

In particular, the playbook 30 contains interpretable commands, in this example, Ansible interpretable commands that are in a YAML Ain't Markup Language (YAML) format. The playbook 30 contains interpretable commands that the automation engine 28 executes, and the interpretable commands implement logic in accordance with power management execution information 32. Based on the power management execution information 32, the automation engine utilizes a particular fence agent scripts 34 of a plurality of different fence agent script 34. Each fence agent script 34 is configured to communicate with a particular type of power management device 22.

As an example, assume that the entity manager 18 determines that the host computing device 20-1 has stopped responding. The entity manager 18 determines that a restart power management function should be attempted against the host computing device 20-1 to bring the host computing device 20-1 to a responding state.

The entity manager 18 generates the power management execution information 32 based on the entity information 26 associated with the host computing device 20-1. Specifically, the entity manager 18 assigns to a fence agent variable 36-1 an identifier that identifies the particular fence agent script 34 that is used to communicate with the fence agent 24-1. The entity manager 18 assigns to a password variable 36-2 the credentials of the power management device 22-1. The entity manager 18 assigns to an IP address variable 36-3 the IP address of the power management device 22-1. The entity manager 18 assigns to a port variable 36-4 the port number to use when communicating with the power management device 22-1. The entity manager 18 assigns to a node name variable 36-5 the node name of the host computing device 20-1. The entity manager 18 assigns to an action variable 36-6 the power management function "restart."

The entity manager 18 then initiates the automation engine 28 on the computing device 12 with the power management execution information 32 and the playbook 30. The automation engine 28 accesses the playbook 30. Based on the fence agent variable 36-1, the automation engine 28 selects the fence agent script 34-1. Based on the action variable 36-6, the automation engine 28 then initiates the restart power management function against the power management device 22-1 using the fence agent script 34-1.

In some examples, the computing device 12 may include one or more power management plug-ins 38-1-38-N (generally, plug-ins 38). Each plug-in 38 includes interpretable instructions that implement power management functionality against a host computing device 20 via a corresponding power management device 22.

Figure 2:
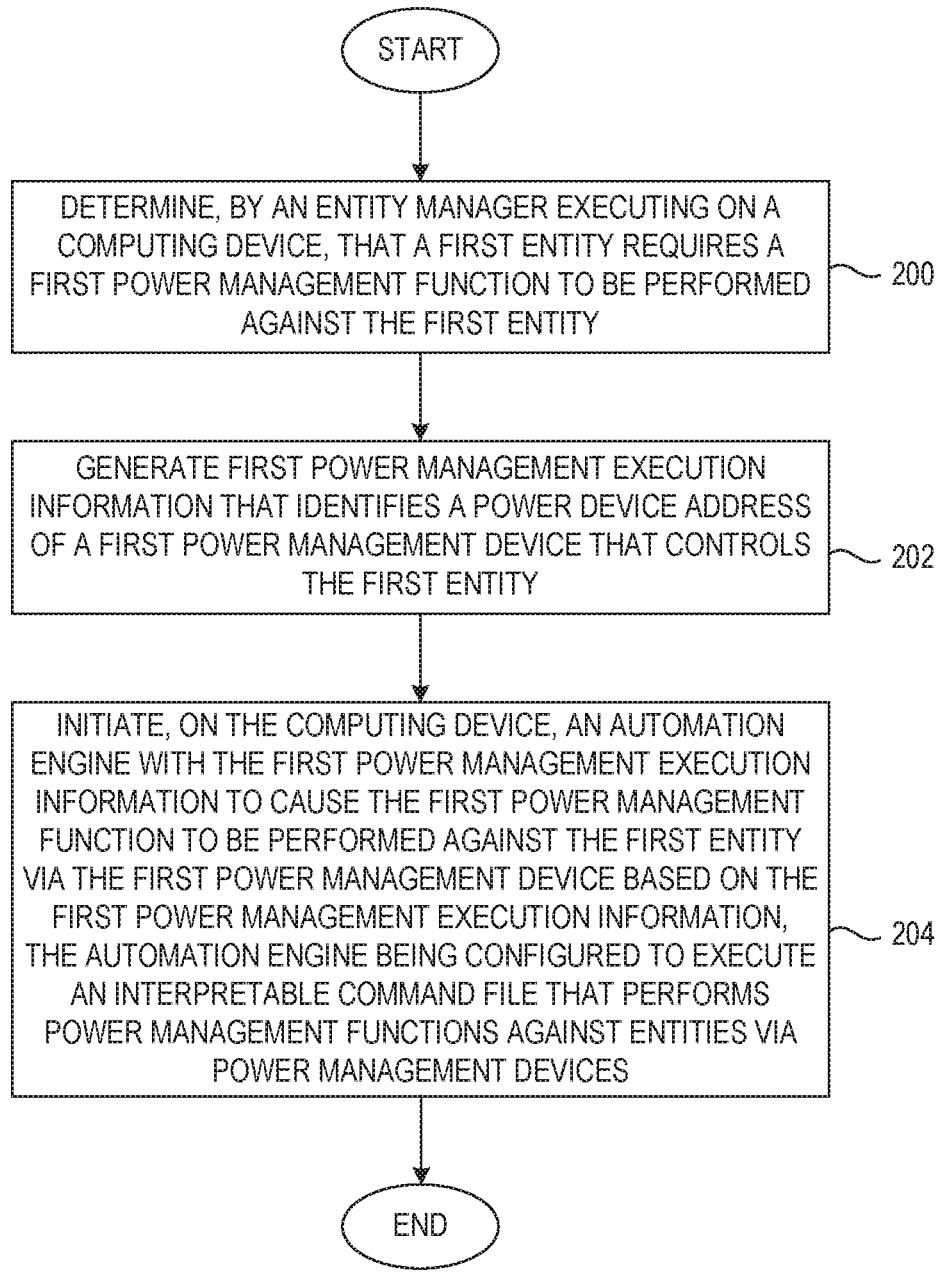
FIG. 2 is a flowchart of a method for implementing proxy-less power management using an automation engine according to one example.

FIG. 2 is a flowchart of a method for implementing proxy-less power management using the automation engine 28 according to one example. The entity manager 18 determines that the host computing device 20-1 requires a power management function to be performed against the host computing device 20-1 (FIG. 2, block 100). The entity manager 18 generates the power management execution information 32 that identifies the power device address of the power management device 22-1 that controls the host computing device 20-1 (FIG. 2, block 102). The entity manager 18 initiates the automation engine 28 with the power management execution information 32 on the computing device 12 to cause the power management function to be performed against the host computing device 20-1 via the power management device 22-1 based on the power management execution information 32. The automation engine 28 is configured to execute the playbook 30 that performs power management functions against entities via power management devices based on the power management execution information 32 (FIG. 2, block 104).

Figure 3:
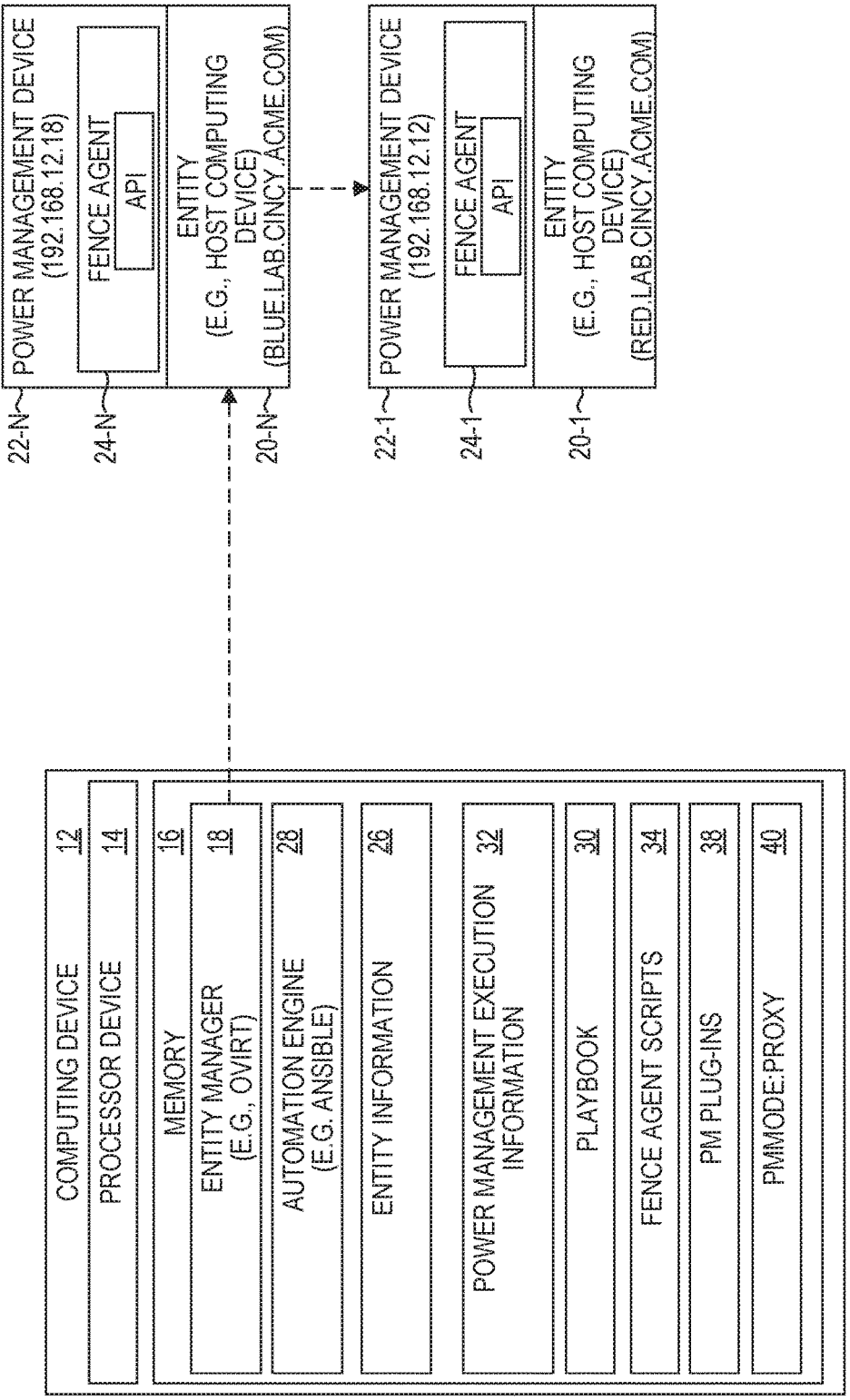
FIG. 3 is a block diagram of a dual mode power management environment according to one example.

FIG. 3 is a block diagram of a dual mode power management environment 10-2 according to one example. The environment 10-2 is substantially similar to the environment 10-1 except as otherwise discussed herein. In this example, power management functionality may be implemented in a proxy-less manner via the automation engine 28 as discussed with regard to FIGS. 1 and 2, or may be implemented in a proxy manner. The proxy manner may allow a user to choose whether to maintain legacy proxy power management functionality, or select proxy-less power management functionality.

In this example, the host computing device 20-1 has a proxy entity, the host computing device 20-N, which is able perform power management functions against the host computing device 20-1. The host computing device 20-N may also serve as a normal host computing device 20 in the environment 10-2. In fact, the host computing device 20-1 may serve as a proxy entity for the host computing device 20-N. The host computing device 20-N is configured, upon request from the entity manager 18, to perform power management functions against the host computing device 20-1.

As an operational example, the entity manager 18 may determine that the host computing device 20-1 has become unresponsive and thus that the host computing device 20-1 requires a power management function to be performed against the host computing device 20-1.

In this example the entity manager 18 accesses configuration data, such as a power management mode 40, and determines whether a current power management mode is a proxy mode or a non-proxy mode. In this example, the entity manager 18 determines that the current power management mode is the proxy mode. The entity manager 18 accesses the entity information 26 and determines that the host computing device 20-N is a proxy entity for the host computing device 20-1 and is therefore configured to send power management commands to the host computing device 20-1. The entity manager 18 sends the host computing device 20-N a command directing the host computing device 20-N to perform the power management function against the host computing device 20-1. The host computing device 20-N, in response to the commands, performs the power management function against the host computing device 20-1.

Figure 4:
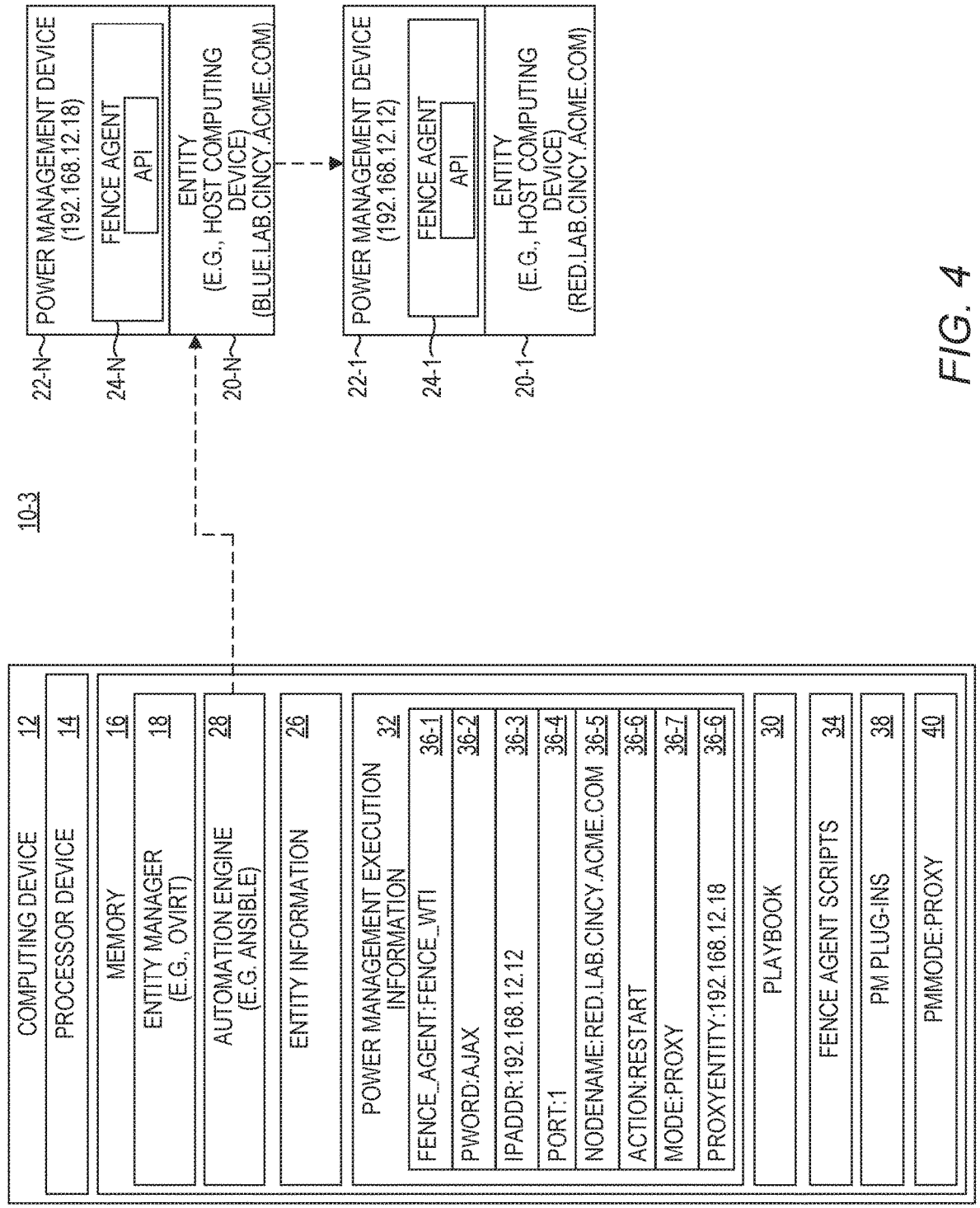
FIG. 4 is a block diagram of a dual mode power management environment according to another example.

FIG. 4 is a block diagram of a dual mode power management environment 10-3 according to another example. The environment 10-3 is substantially similar to the environments 10-1, 10-2 except as otherwise discussed herein. In this example, similar to the environment 10-2 discussed above with regard to FIG. 3, power management functionality may be implemented in a proxy-less manner via the automation engine 28 as discussed with regard to FIGS. 1 and 2, or may be implemented in a proxy manner. However, in the environment 10-3, the automation engine 28 directs the host computing device 20-N to perform the power management functions against the host computing device 20-1.

As an operational example, assume that the entity manager 18 determines that the host computing device 20-1 has become unresponsive and thus that the host computing device 20-1 requires a power management function to be performed against the host computing device 20-1. The entity manager 18 accesses configuration data, such as the power management mode 40, and determines whether the current power management mode is the proxy mode or the non-proxy mode. In this example, the entity manager 18 determines that the current power management mode is the proxy mode. The entity manager 18 accesses the entity information 26 and determines that the host computing device 20-N is a proxy entity for the host computing device 20-1 and is therefore configured to send power management commands to the host computing device 20-1 via the power management device 22-N. The entity manager 18 generates the power management execution information 32 and sets the IP address variable 36-3 to the IP address of the power management device 22-1. The entity manager 18 assigns to the port variable 36-4 the port number to use when communicating with the power management device 22-1. The entity manager 18 assigns to the node name variable 36-5 the node name of the host computing device 20-1. The entity manager 18 assigns to the action variable 36-6 the power management function "restart". The entity manager 18 assigns to a proxy device identifier variable 36-8 data, such as an IP address, that identifies the host computing device 20-N as the proxy entity for the host computing device 20-1. The entity manager 18 assigns to a power management mode identifier variable 36-7 data that identifies the current power management mode as the proxy mode.

The entity manager 18 executes, on the computing device 12, the automation engine 28 with the power management execution information 32 to cause the power management function to be performed by the host computing device 20-N against the host computing device 20-1 via the power management device 22-N. The automation engine 28 connects to the host computing device 20-N, and based on the power management execution information 32, initiates, from the host computing device 20-N the power management function against the host computing device 20-1 via the power management device 22-N using a corresponding fence agent script 34 and the power management execution information 32.

Figure 5:
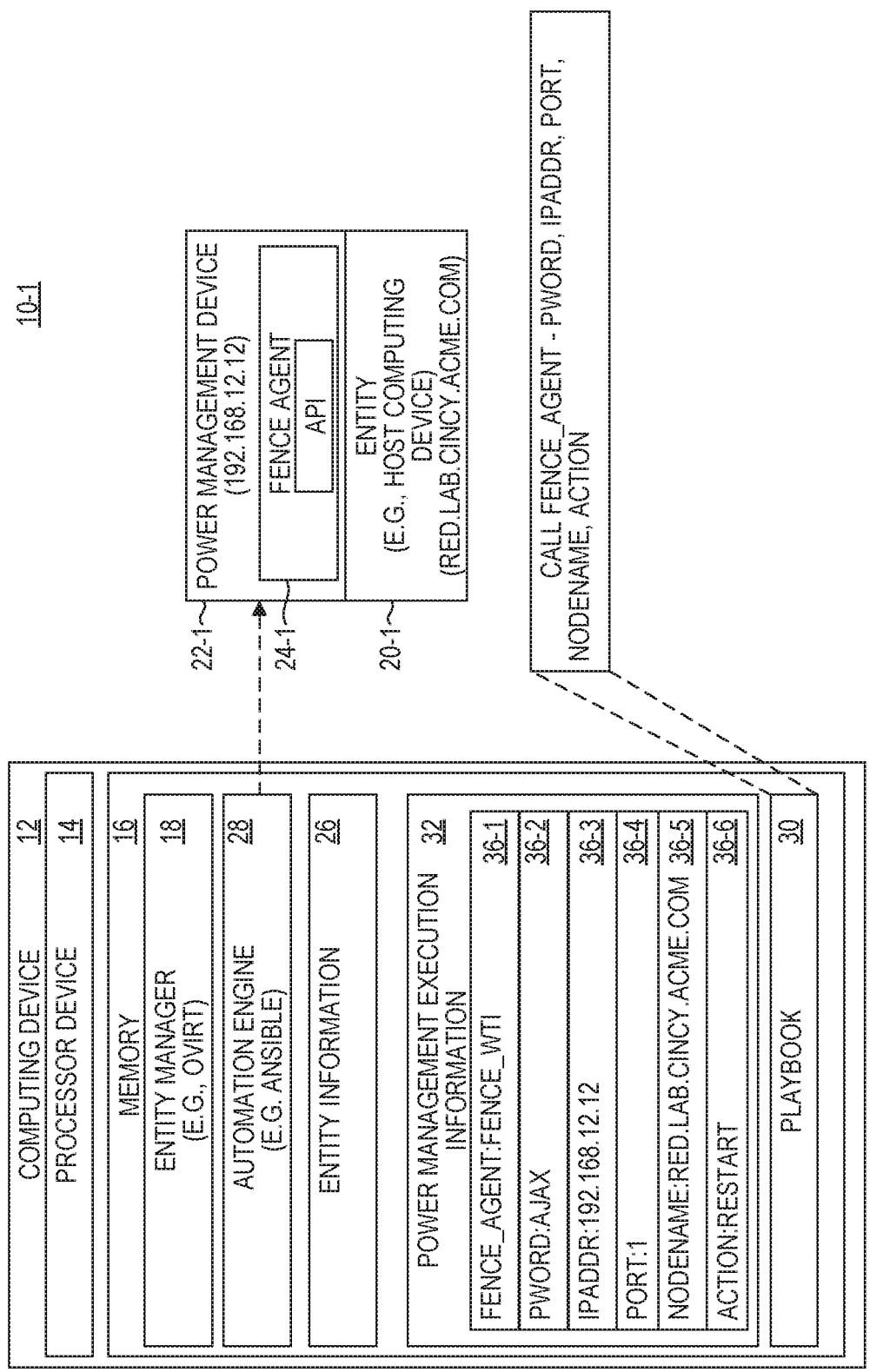
FIG. 5 is a simplified block diagram of the environment illustrated in FIG. 1 according to one example.

FIG. 5 is a simplified block diagram of the environment 10-1 illustrated in FIG. 1 according to one example. The environment 10-1 includes the computing device 12, the memory 16, and the processor device 14 coupled to the memory 16. The processor device 14 is to determine, by the entity manager 18 executing on the computing device 12, that the host computing device 20-1 requires a power management function to be performed against the host computing device 20-1. The processor device 14 is further to generate the power management execution information 32 that identifies the power device address of the power management device 22-1 that controls the host computing device 20-1. The processor device 14 is further to initiate, on the computing device 12, the automation engine 28 with the power management execution information 32 to cause the power management function to be performed against the host computing device 20-1 via the power management device 22-1 based on the power management execution information 32. In some embodiments, the automation engine 28 may be configured to execute an interpretable command file that performs power management functions against host computing devices 20 via power management devices 22.

Figure 6:
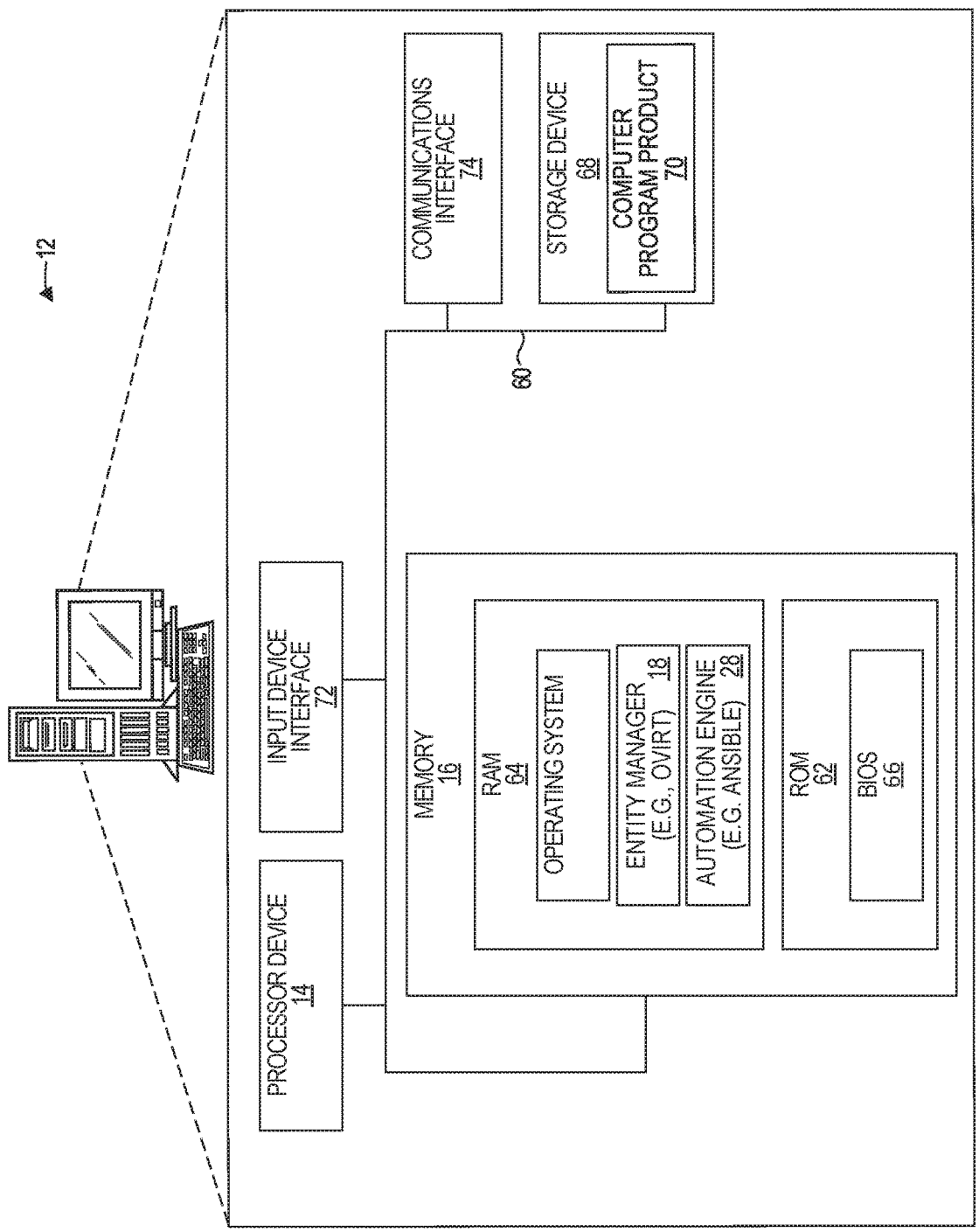
FIG. 6 is a block diagram of a computing device suitable for implementing examples disclosed herein.

FIG. 6 is a block diagram of the computing device 12 suitable for implementing examples disclosed herein. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the memory 16, and a system bus 60. The system bus 60 provides an interface for system components including, but not limited to, the memory 16 and the processor device 14. The processor device 14 can be any commercially available or proprietary processor.

The system bus 60 may be any of several types of bus structures that may further interconnect to a memory bus (with or without a memory controller), a peripheral bus, and/or a local bus using any of a variety of commercially available bus architectures. The memory 16 may include non-volatile memory 62 (e.g., read-only memory (ROM), erasable programmable read-only memory (EPROM), electrically erasable programmable read-only memory (EEPROM), etc.), and volatile memory 64 (e.g., random-access memory (RAM)). A basic input/output system (BIOS) 66 may be stored in the non-volatile memory 62 and can include the basic routines that help to transfer information between elements within the computing device 12. The volatile memory 64 may also include a high-speed RAM, such as static RAM, for caching data.

The computing device 12 may further include or be coupled to a non-transitory computer-readable storage medium such as a storage device 68, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 68 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 68 and in the volatile memory 64, including an operating system and one or more program modules, such as the entity manager 18 and automation engine 28, which may implement the functionality described herein in whole or in part.

All or a portion of the examples may be implemented as a computer program product 70 stored on a transitory or non-transitory computer-usable or computer-readable storage medium, such as the storage device 68, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the entity manager 18 and automation engine 28 in the volatile memory 64, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 14 through an input device interface 72 that is coupled to the system bus 60 but can be connected by other interfaces such as a parallel port, an Institute of Electrical and Electronic Engineers (IEEE) 1394 serial port, a Universal Serial Bus (USB) port, an infrared (IR) interface, and the like. The computing device 12 may also include a communications interface 74 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   determining, by an entity manager executing on a computing device, that a first entity requires a first power management function comprising one of a power on power management function, a power off power management function, and a restart power management function to be performed against the first entity;
   generating first power management execution information that identifies a power device address of a first power management device that controls power to the first entity;
   selecting, by the entity manager, a fence agent script from a plurality of fence agent scripts, for use with the first power management device; and
   initiating, on the computing device, an automation engine with the first power management execution information to cause the first power management function to be performed against the first entity via the first power management device using the fence agent script.

2. The method of claim 1 further comprising:
   storing, in the first power management execution information, a fence agent script identifier that identifies the fence agent script.

3. The method of claim 2 wherein selecting, by the entity manager, the fence agent script further comprises selecting the fence agent script from the plurality of fence agent scripts based on a type of power management device of the first power management device.

4. The method of claim 1 further comprising:
   prior to generating the first power management execution information, accessing, by the entity manager, configuration data to determine whether a current power management mode is a proxy mode or a non-proxy mode; and
   based on determining that the current power management mode is the non-proxy mode, generating the first power management execution information that identifies the power device address of the first power management device that controls the power to the first entity.

5. The method of claim 1 wherein determining, by the entity manager, that the first entity requires the first power management function to be performed against the first entity comprises detecting, by the entity manager, that the first entity has failed to respond to a polling request.

6. The method of claim 1 wherein the first power management execution information comprises authentication credentials of the first entity.

7. A computing device, comprising:
   a memory; and
   a processor device coupled to the memory to:
      determine, by an entity manager executing on the computing device, that a first entity requires a first power management function comprising one of a power on power management function, a power off power management function, and a restart power management function to be performed against the first entity;
      generate first power management execution information that identifies a power device address of a first power management device that controls the power to the first entity;
      selecting, by the entity manager, a fence agent script from a plurality of fence agent scripts, for use with the first power management device; and
      initiate, on the computing device, an automation engine with the first power management execution information to cause the first power management function to be performed against the first entity via the first power management device using the fence agent script.

8. The computing device of claim 7 wherein the processor device is further to:
   store, in the first power management execution information, a fence agent script identifier that identifies the fence agent script.

9. The computing device of claim 8 wherein to select, by the entity manager, the fence agent script, the processor device is further to select the fence agent script from the plurality of fence agent scripts based on a type of power management device of the first power management device.

10. The computing device of claim 7 wherein the processor device is further to:
    prior to generating the first power management execution information, access, by the entity manager, configuration data to determine whether a current power management mode is a proxy mode or a non-proxy mode; and
    based on determining that the current power management mode is the non-proxy mode, generate the first power management execution information that identifies the power device address of the first power management device that controls the power to the first entity.

11. The computing device of claim 7 wherein to determine, by the entity manager, that the first entity requires the first power management function to be performed against the first entity, the processor device is further to detect, by the entity manager, that the first entity has failed to respond to a polling request.

12. The computing device of claim 7 wherein the first power management execution information comprises authentication credentials of the first entity.

13. A method comprising:
    determining, by an entity manager executing on a computing device, that a first entity requires a first power management function to be performed against the first entity;
    accessing, by the entity manager, configuration data to determine whether a current power management mode is a proxy mode or a non-proxy mode;
    based on determining that the current power management mode is the proxy mode, generating first power management execution information that identifies a proxy entity that is configured to send power management commands to the first entity via a first power management device that controls power to the first entity; and
    initiating, on the computing device, an automation engine with the first power management execution information to cause the proxy entity to communicate with the first power management device to perform the first power management function against the first entity.

14. The method of claim 13 wherein the first power management execution information comprises:
- a power device address of the first power management device that controls the power to the first entity;
- a proxy device identifier that identifies the proxy entity; and
- a power management mode identifier that identifies the current power management mode as the proxy mode.

15. The method of claim 14 further comprising:
- connecting, by the automation engine, to the proxy entity; and
- based on the first power management execution information, initiating, from the proxy entity, the first power management function against the first entity via the first power management device using a fence agent script and the first power management execution information.

16. The method of claim 15 wherein connecting, by the automation engine, to the proxy entity comprises initiating, to the proxy entity from the computing device, a secure shell (SSH) secure channel.

* * * * *